United States Patent [19]
Shirato

[11] Patent Number: 5,129,123
[45] Date of Patent: Jul. 14, 1992

[54] APPARATUS FOR ADJUSTING A PRESSING FORCE OF A WIPER

[75] Inventor: Masayoshi Shirato, Kiryu, Japan

[73] Assignee: Mitsuba Electric Manufacturing Co., Ltd., Japan

[21] Appl. No.: 607,859

[22] Filed: Oct. 22, 1990

Related U.S. Application Data

[63] Continuation of Ser. No. 360,583, Jun. 2, 1989, abandoned.

[30] Foreign Application Priority Data

Jun. 14, 1988 [JP] Japan .................... 63-146359

[51] Int. Cl.$^5$ .................... B60S 1/34; B60S 1/32
[52] U.S. Cl. .................... 15/250.2
[58] Field of Search .......... 15/250.19, 250.20, 250.34, 15/250.35

[56] References Cited

U.S. PATENT DOCUMENTS

| 2,289,552 | 7/1942 | Rousseau | 15/250.20 |
| 4,370,774 | 2/1983 | Bienert et al. | 15/250.20 |

FOREIGN PATENT DOCUMENTS

| 880864 | 6/1953 | Fed. Rep. of Germany | 15/250.19 |
| 1480726 | 4/1970 | Fed. Rep. of Germany | 15/250.19 |
| 2824074 | 12/1979 | Fed. Rep. of Germany | 15/250.20 |
| 3231849 | 3/1984 | Fed. Rep. of Germany | 15/250.20 |
| 3314456 | 10/1984 | Fed. Rep. of Germany | 15/250.20 |
| 3428710 | 2/1986 | Fed. Rep. of Germany | 15/250.20 |
| 605228 | 5/1960 | Italy | 15/250.20 |
| 86840 | 7/1981 | Japan | 15/250.20 |
| 60-30857 | 3/1985 | Japan . | |
| 61-14159 | 1/1986 | Japan . | |
| 61-150662 | 9/1986 | Japan . | |
| 53153 | 3/1988 | Japan | 15/250.35 |
| 2180442 | 4/1987 | United Kingdom | 15/250.20 |

Primary Examiner—Harvey C. Hornsby
Assistant Examiner—Gary Graham
Attorney, Agent, or Firm—Oliff & Berridge

[57] ABSTRACT

There is disclosed an apparatus for adjusting a pressing force of a wiper. The apparatus includes a spring, an operation lever connected to a proximal end of the spring, an arm head for swayably supporting the top of this lever, an arm member provided at a proximal end of the lever, and a cam member. The arm member impinges upon the cam member rotated by a driving motor to undergo a displacement of the spring biasing direction towards the window face. The cam member has its cam face arranged to vary an impingment position of the arm member from a large diameter portion via a stepped portion to a small diameter portion by rotation of the cam member.

5 Claims, 3 Drawing Sheets

LOW　　　　　　　　HIGH

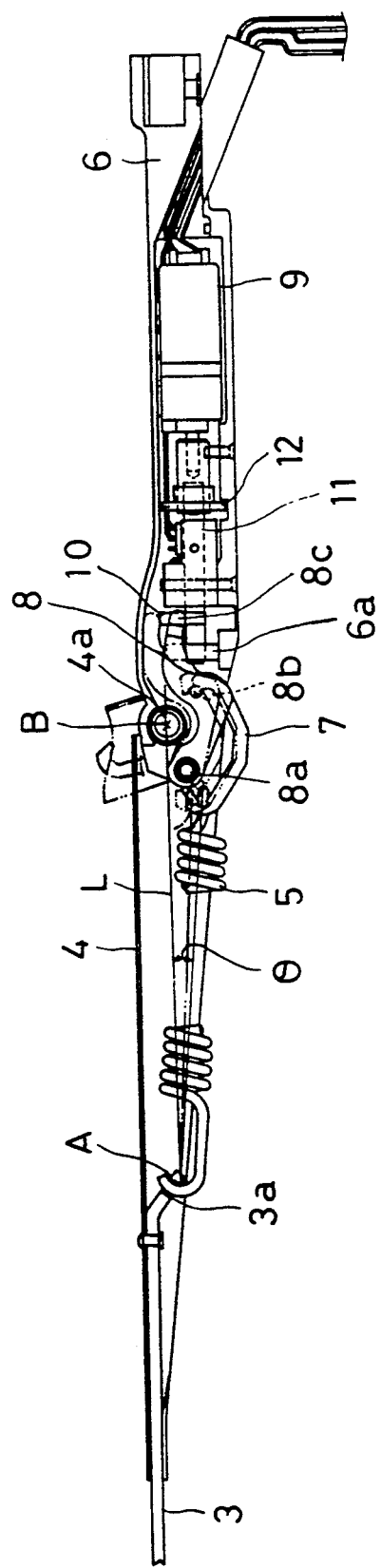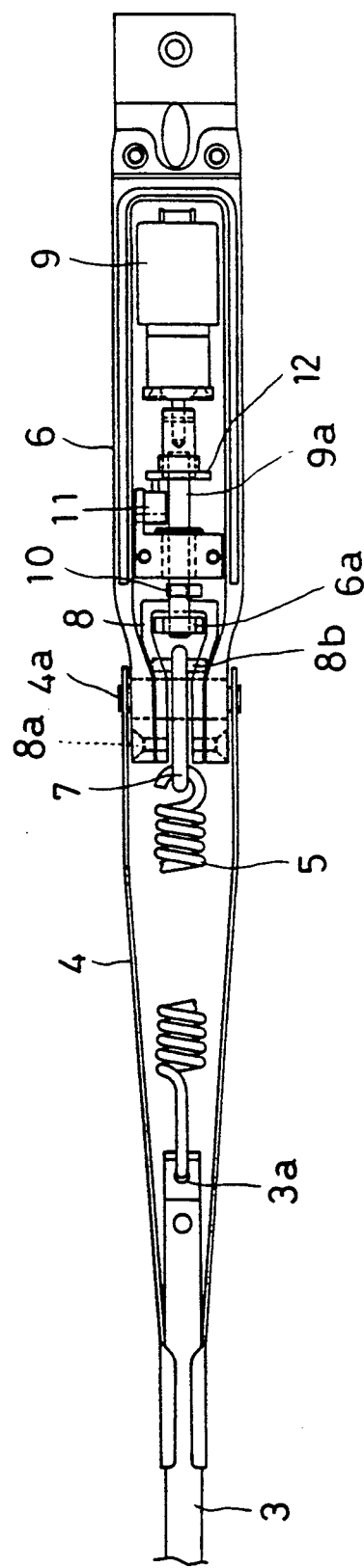

APPARATUS FOR ADJUSTING A PRESSING FORCE OF A WIPER

This is a continuation of application Ser. No. 07/360,583 filed Jun. 2, 1989, now abandoned.

BACKGROUND OF THE INVENTION

1. Field of the Invention

The present invention relates to an apparatus for adjusting a pressing force of a wiper for wiping a window face of a vehicle such as an automobile.

2. Description of the Related Art

In general, a conventional wiper of this type presents such a defect that when a velocity at which a vehicle travels increases, a wiper blade floats due to a dynamic lift caused by air flow about the vehicle, resulting in a decline in wiping capability of the wiper. For the purpose of preventing such a decline in wiping capability during high-speed travelling, a biasing force of a spring for pressing the wiper blade against the window face is adjusted in association with a motor drive. There have been proposed a variety of means for preserving the wiping capability of the wiper blade during high-speed travelling. Even if these means are based on the motor drive, however, they do not fulfill the requirement that the biasing force of the spring be varied instantaneously, and it follows that the variations in biasing force take much time. In the meantime, the wiper blade remains in a state where the original wiping capability is degraded.

SUMMARY OF THE INVENTION

It is a primary object of the present invention, which has been inspired by the foregoing circumstances, to provide an apparatus for adjusting a pressing force of a wiper which is capable of obviating the above-mentioned defects.

To this end, according to one aspect of the invention, in a wiper adapted to increase a pressing force of a blade on a window face by causing displacement of a biasing direction of a spring whose top end is linked to an arm member towards the window face, there is provided an apparatus for adjusting a pressing force of a wiper, characterized in that: a proximal end of the spring is connected to a middle part of an operation lever having its top end swayably pivotally supported on an arm head; the arm member at the proximal end of the operation lever is forcibly impinged upon a cam member rotated by driving a motor so as to undergo the displacement of the biasing direction of the spring towards the window face; and the cam member is formed with a cam face arranged to vary an impingement position of the arm member from a large diameter portion remote from the window face to a small diameter portion close thereto through a stepped portion by rotation of the cam member.

Based on this construction, the apparatus of the invention is capable of almost instantaneously effecting an adjustment for increasing the blade pressing force on the window face.

BRIEF DESCRIPTION OF THE DRAWINGS

Other objects and advantages of the invention will become apparent from the following discussion taken in conjunction with the accompanying drawings which, in combination, show an illustrative embodiment of an apparatus for adjusting a pressing force of a wiper according to the present invention, wherein:

FIG. 2 is side view in section depicting the principal portion of the wiper;

FIG. 3 is a bottom view showing the principal portion of the wiper;

DESCRIPTION OF THE PREFERRED EMBODIMENT

Figure 1:
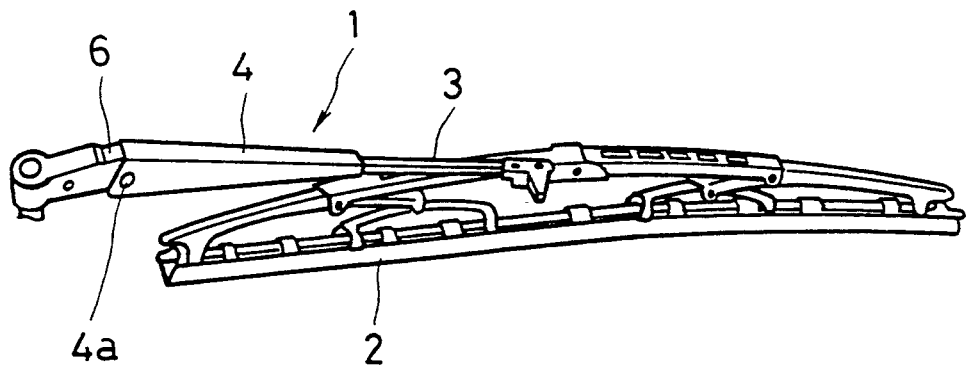
FIG. 1 is a perspective view illustrating a wiper.

One illustrative embodiment of the present invention will hereinafter be described. Throughout the drawings, the numeral 1 represents a wiper arm. Wiper arm 1 is composed of: an arm piece 3 the top end of which is fitted with a blade 2; a retainer 4 integrally secured to the proximal end of arm piece 3; and an arm head 6 on which retainer 4 is swayably supported through a fulcrum shaft 4a. This construction corresponds generally to constructions known in the art.

A spring (draft spring) generally designated at 5 has its one end connectively engaging with an engagement hole 3a formed in the proximal end of arm piece 3. The other end of spring 5 engages with the top end of a hook 7. The top end of an operation lever 8 is swayably pivotally supported on a pivot 8a in a position closer to the top end than fulcrum shaft 4a, while the other end of hook 7 engages with a stopper pin 8b provided at a middle part of operation lever 8. Operation lever 8 is constantly biased by a biasing force of spring 5 towards a window face disposed downwards, i.e., the operation lever is swayed in a direction away from a reference line L (conceived as a dead point of spring 5) which connects a spring fulcrum A of engagement hole 3a to a center B of fulcrum shaft 4a.

Figure 4:
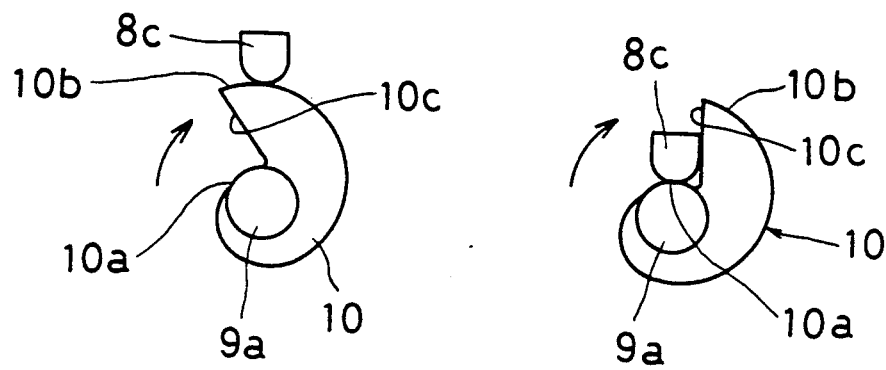
FIG. 4 is a diagram of assistance in explaining the operations of a cam.

On the other hand, arm head 6 incorporates a motor equipped with a speed reduction mechanism. An output shaft 9a of motor 9 is protruded in the longitudinal direction of wiper arm 1; its top end is rotatably supported on a shaft holder 6a provided at the top end of arm head 6. A cam member 10 is integrally provided slightly closer to the proximal end than shaft holder 6a of output shaft 9a. An arm member 8c at a proximal end is impinged by pressing from above upon a cam face formed on the outer periphery of cam member 10 to undergo displacement of operation lever 8 biased by spring 5 towards the window face. The cam face of cam member 10 assumes such a configuration that a small diameter portion 10a (FIG. 4) is contiguous to a large diameter portion 10b through a stepped portion 10c. Where arm member 8c impinges upon large diameter portion 10b, operation lever 8 is kept in contact with cam member 10 in a position remote from the window face in close proximity to reference line L. When cam member 10 is rotated by driving motor 9, the position in which arm member 8c impinges thereupon is swayably varied in an instant from large diameter portion 10b via stepped portion 10c to small diameter portion 10a close to the window face. As a result, there is caused displacement of a biasing direction of spring 5 towards the window face, viz., the displacement is effected in such a direction as to increase an action angle $\theta$ of spring 5 with respect to reference line L, with the result that a pressing force of blade 2 on the window face grows.

The numeral 11 denotes a detection switch incorporated into arm head 6. Secured to output shaft 9a is a second cam 12 acting on detection switch 11. Second cam 12 impinges upon a switch arm of detection switch 11 concurrently when, for instance, arm member 8c comes to a position which permits the impingement upon large diameter portion 10b, whereby detection switch 11 comes into its detecting operation.

Figure 6:
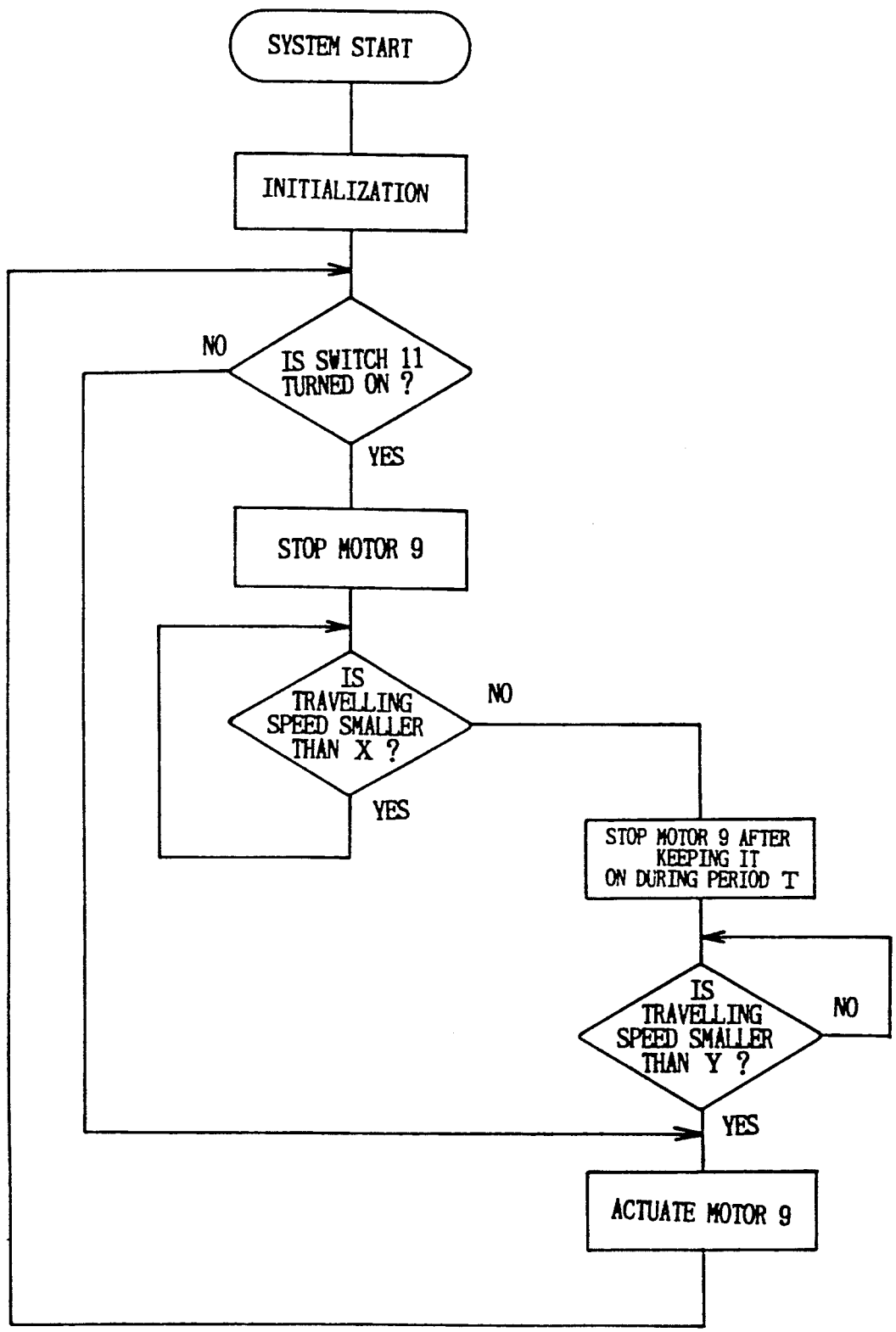
FIG. 6 is a control flowchart.

Drive control of motor 9 can be effected in the following manner. As shown in FIG. 6, when an engine starts, the system is initialized and detection switch 11 judges whether second cam 12 is in an impingement state (i.e., the pressing force on the window face is small, wherein arm member 8c impinges upon large diameter portion 10b) or not. If second cam 12 is in a non-impingement state, immediately motor 9 is driven to present the impingement state. Subsequently, a travelling velocity may increase from a specified normal level to exceed a preset velocity X. If judged so (this is detected by a separately provided speed detection sensor 13), motor 9 is timer-driven for a period T required for moving the cam member impingement position of arm member 8c from large diameter portion 10b via stepped portion 10c to small diameter portion 10a. This state is maintained, thereby, as discussed above, causing the displacement of the biasing direction of spring 5 towards the window face. A specified high-speed mode is thus developed, wherein the pressing force of blade 2 on the window face is increased. In the wake of this process, the travelling velocity may drop down, and if it drops lower than a preset velocity Y (which is not necessarily equal to the above-described preset velocity X, but may be set smaller than this value), motor 9 is actuated and continues to be driven until detection switch 11 initiates its detection (is turned on). Then, the pressing force of blade 2 on the window face reverts to the specified normal mode.

Figure 5:
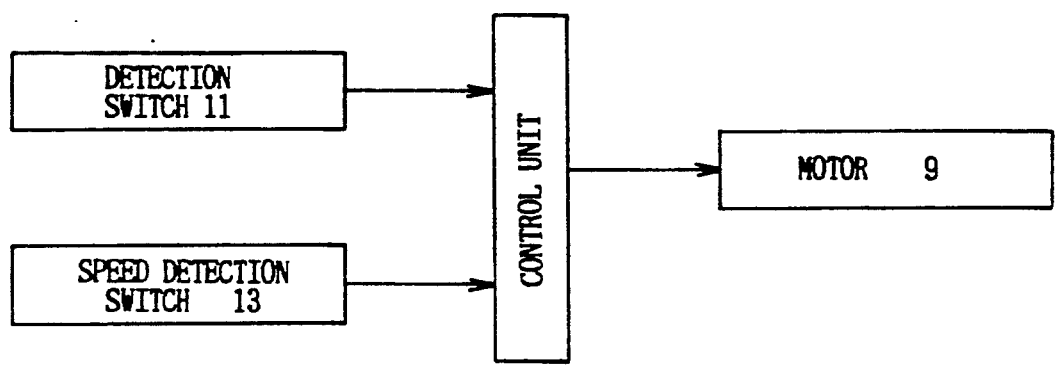
FIG. 5 is a block circuit diagram showing a circuit for controlling a motor drive.

As shown in FIG. 5, to achieve the above-described control, a control unit of known construction per se, such as a microprocessor, is provided. Outputs from detection switch 11 and speed detection switch 13 are input to the control unit. Based thereon, suitable output signals are provided to control the motor 9.

In the thus constituted embodiment of the present invention, when the travelling velocity is lower than preset velocity X, as explained earlier, arm member 8c impinges upon large diameter portion 10b, and the biasing force of spring 5 acts along a line spaced away from the window face. Then, the specified normal mode is present, wherein the pressing force of blade 2 on the widow face is small. In this state, when the acceleration is effected to exceed preset velocity X, motor 9 is driven during the timer period T. In consequence of this, operation lever 8 is swayed by the biasing force given by spring 5 to move along stepped portion 10c and instantaneously impinge upon small diameter portion 10a, thus moving closer to the window face. In this manner, there is caused the displacement of the biasing direction of spring 5 towards the window face from the specified normal mode, thereby obtaining a larger pressing force on the window face. It is therefore possible to steer clear of a phenomenon where blade 2 floats upon air flows created by vehicle movement.

As discussed above, in accordance with the present invention, it is possible to surely prevent the floating phenomenon of blade 2 by incrementing the blade pressing force on the window face during the high-speed travelling. The pressing force can be varied in an instant. Namely, the apparatus of the invention functions to increase and adjust the blade pressing force acting on the window face by changing the biasing direction of spring 5 so as to be positioned in close proximity to the window face by the rotation of cam member 10. The variations in biasing direction thereof are instantaneously made by changing the position in which arm member 8c impinges upon cam member 10, from large diameter portion 10b remote from the window face, via stepped portion 10c, to small diameter portion 10a close thereto, while receiving the biasing force of spring 5. Thus, when necessary, it is possible to immediately exhibit a window wiping capability suitable for high-speed travelling.

Additionally, the apparatus of the invention effects the change-over from the specified normal mode to the specified high-speed mode without the transgression of the spring 5 over reference line L. Rather, the displacement is effected under a constant biasing force of spring 5. Hence, the specified modes can smoothly be varied with no obstacle, and the load on motor 9 can be reduced.

In the apparatus according to the present invention, motor 9 is mounted in such a direction as to set output shaft 9a towards the wiper arm, and hence the motor can be accommodated without increasing a width of arm head 6. For this reason, though the pressing force of the blade is to be changed, the arm head can be diminished in size.

As discussed above, in the thus constructed apparatus of the invention, when greatly changing the blade pressing force on the window face during high-speed travelling, the position of the operation arm undergoing the biasing force of the spring is swayably varied in an instant from the large diameter portion via the stepped portion to the adjacent small diameter portion so that the arm member provided at the proximal end makes the impingement when rotating the cam member based on the motor drive. With this arrangement, the displacement of the biasing direction of the spring towards the window face is instantaneously caused, whereby the blade pressing force working on the window face is increased. Consequently, blade floating is avoided to obtain a good wiping capability.

Although an illustrative embodiment of the present invention has been described in detail with reference to the accompanying drawings, it is to be understood that the invention is not limited to this embodiment. Various changes or modifications may be effected thereto by one skilled in the art without departing from the scope or spirit of the invention.

What is claimed is:

1. In a wiper arm having a longitudinal axis and adapted to be pressed against a window face under spring bias by a spring having opposite ends and linked at one of said ends to an armpiece which is arranged along the longitudinal axis of said wiper arm and pivoted to an arm head, an apparatus for adjusting a pressing force of the wiper arm, comprising:

an operation lever having a first end portion and a second end portion oriented along said longitudinal axis of said wiper arm and a middle portion connected with the other end of the spring, the second end portion comprising an arm member;

said arm head pivotally supporting said first end portion of said operation lever;

said arm member being housed within said arm head, said arm member being constantly biased toward the window face by a biasing force of said spring;

a one-way driving motor housed within said arm head and including an output shaft rotating in one direction and extending along said longitudinal axis of said wiper arm; and a cam member having an outer peripheral surface with a cam face and being housed within said arm head, said cam member being supported by said output shaft so as to rotate integrally with said output shaft, said arm member being forcibly impinged upon said cam face, and a pressing force of said wiper arm increasing by changing the position of said arm member from a first position which is far from the window face to a second position which is close to the window face, and wherein according to the rotation of said driving motor, said cam face of said cam member varies from a large diameter portion, to a stepped portion, to a small diameter portion and to an arc portion, said arc portion being positioned between said large diameter portion and said small diameter portion, said pressing force of said wiper arm is varied by changing the impinged position of said arm member on said cam face from said first position to said second position corresponding to variations of said cam face moved by said one way driving motor, and said pressing force is varied by said arm member changing from said first position impinging on said large diameter portion to said second position impinging on said small diameter portion by passing over said stepped portion and without impinging on said arc portion, and causing said pressing force of said wiper arm to instantaneously increase, and said driving motor, said cam member and said operation lever are housed within said arm head generally linearly aligned with said longitudinal axis.

2. An apparatus according to claim 1, wherein said operation lever is connected to said spring through an intermediate member with hook means at opposite ends thereof.

3. An apparatus according to claim 1, wherein said stepped portion is provided with a substantially radial face relative to the rotation axis of the output shaft, the diameter of said cam face increasing from said small diameter portion to said large diameter portion.

4. An apparatus according to claim 1, wherein a first reference line is defined between a point on said linked end of said spring and the pivot point of the arm piece to arm head connect and a second reference line is defined between the point on said linked end of said spring and a point on said first end portion of said operation lever when said arm member is in said second position, the pressing force of the wiper arm being changeable by a change in an action angle defined between the first and second reference lines.

5. An apparatus according to claim 1, wherein said spring is generally parallel to said arm head when said arm member is in said first position.

* * * * *